(12) United States Patent
DeCesaris et al.

(10) Patent No.: US 9,367,442 B2
(45) Date of Patent: Jun. 14, 2016

(54) ALLOCATING MEMORY USAGE BASED ON VOLTAGE REGULATOR EFFICIENCY

(71) Applicant: Lenovo Enterprise Solutions (Singapore) PTE. LTD., Singapore (SG)

(72) Inventors: Michael DeCesaris, Carrboro, NC (US); James J. Parsonese, Cary, NC (US); Luke D. Remis, Raleigh, NC (US); Brian C. Totten, Durham, NC (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 62 days.

(21) Appl. No.: 14/329,902

(22) Filed: Jul. 12, 2014

(65) Prior Publication Data

US 2016/0011962 A1    Jan. 14, 2016

(51) Int. Cl.
*G06F 12/02* (2006.01)
*G06F 11/34* (2006.01)
*G06F 11/30* (2006.01)

(52) U.S. Cl.
CPC .......... *G06F 12/023* (2013.01); *G06F 11/3037* (2013.01); *G06F 11/3409* (2013.01); *G06F 2212/254* (2013.01)

(58) Field of Classification Search
CPC ............... G06F 1/3203; G06F 1/3293; G06F 2212/1028; G06F 9/505; G06F 9/5011; G06F 9/5005; G06F 9/5016; G06G 1/3275; Y02B 60/1225
See application file for complete search history.

(56) References Cited

U.S. PATENT DOCUMENTS

| | | | | |
|---|---|---|---|---|
| 7,587,559 B2 * | 9/2009 | Brittain | .................. | G06F 1/3225 711/154 |
| 7,752,468 B2 * | 7/2010 | Dodeja | .................. | G06F 1/3225 713/1 |
| 7,895,455 B2 * | 2/2011 | Green | .................. | G06F 1/26 307/52 |
| 8,055,922 B2 * | 11/2011 | Brittain | .................. | G11C 5/143 711/100 |
| 8,412,972 B2 * | 4/2013 | Cheung | .................. | G06F 1/3225 713/300 |
| 2005/0067902 A1 * | 3/2005 | Bemat | .................. | G06F 1/3203 307/140 |
| 2006/0179333 A1 * | 8/2006 | Brittain | .................. | G11C 5/143 713/320 |
| 2007/0106860 A1 * | 5/2007 | Foster, Sr. | ............. | G06F 1/3225 711/170 |

(Continued)

OTHER PUBLICATIONS

Huang, Hai, et al. "Cooperative software-hardware power management for main memory." Workshop on Power-Aware Computer Systems. 2004.

(Continued)

*Primary Examiner* — Jared Rutz
*Assistant Examiner* — Khoa D Doan
(74) *Attorney, Agent, or Firm* — Olive Law Group, PLLC (57) ABSTRACT

Systems and methods for allocating memory usage based on voltage regulator efficiency are disclosed. According to an aspect, a method may include receiving a first efficiency value of a first voltage regulator associated with a first memory device among multiple memory devices. The method may also include receiving a second efficiency value of a second voltage regulator associated with a second memory device of the memory devices. The method may also include receiving a request to write data to one of the first memory devices and the second memory device. The method may also include determining whether to write the data to the first memory device or the second memory device based on the first and second efficiency values. Further, the method may include writing the data to the first memory device or the second memory device based on the determination.

9 Claims, 7 Drawing Sheets

(56) References Cited

U.S. PATENT DOCUMENTS

| | | | | |
|---|---|---|---|---|
| 2008/0040562 A1* | 2/2008 | Gower | | G06F 1/206 |
| | | | | 711/154 |
| 2008/0183959 A1* | 7/2008 | Pelley | | G06F 12/0862 |
| | | | | 711/109 |
| 2008/0259646 A1* | 10/2008 | Moussaoui | | H02M 3/33507 |
| | | | | 363/17 |
| 2008/0294916 A1* | 11/2008 | Moussaoui | | G06F 1/26 |
| | | | | 713/300 |
| 2010/0002495 A1* | 1/2010 | Adams | | G11C 11/419 |
| | | | | 365/154 |
| 2010/0191991 A1* | 7/2010 | Berke | | G11C 5/143 |
| | | | | 713/320 |
| 2011/0252180 A1* | 10/2011 | Hendry | | G06F 1/3203 |
| | | | | 711/3 |
| 2012/0098334 A1* | 4/2012 | Holmberg | | G06F 1/32 |
| | | | | 307/12 |
| 2013/0028090 A1* | 1/2013 | Yamaguchi | | G06F 1/3206 |
| | | | | 370/235 |
| 2013/0031315 A1* | 1/2013 | Abdulla | | G06F 13/16 |
| | | | | 711/149 |
| 2013/0046967 A1* | 2/2013 | Fullerton | | H03K 3/0315 |
| | | | | 713/100 |
| 2013/0093251 A1* | 4/2013 | Kondo | | H02M 3/1584 |
| | | | | 307/82 |
| 2013/0119962 A1* | 5/2013 | Holmberg | | H02J 1/00 |
| | | | | 323/304 |
| 2013/0151877 A1 | 6/2013 | Kadri et al. | | |
| 2013/0246715 A1* | 9/2013 | Miyauchi | | G06F 9/505 |
| | | | | 711/147 |

OTHER PUBLICATIONS

5. Deng, Qingyuan, et al. "Memscale: active low-power modes for main memory." ACM SIGPLAN Notices 46.3 (2011):225-238.

Vahdat, Amin, et al. "Every Joule is Precious: The Case for Revisiting Operating System Design for Energy Efficiency." Proceedings of the 9th Workshop on ACM SIGOPS European Workshop: Beyond the PC: New Challenges for the Operating System, Dept. of Computer Science, Duke University, 2000.

* cited by examiner

ALLOCATING MEMORY USAGE BASED ON VOLTAGE REGULATOR EFFICIENCY

TECHNICAL FIELD

The present invention is related to computing device memory, and more specifically, to allocating memory usage based on voltage regulator efficiency.

BACKGROUND

Typically, memory allocation in a computing device is controlled by the operating system of the computing device. The operating system usually optimizes memory access for best performance by balancing memory access multiple channels provided access to the memory. When power savings and efficiency in a computing device are desired, the operating system is usually configured to using basic static policy settings. Such static policy settings may include controlling the speed of memory access (i.e., dual in-line memory module (DIMM) speed) or the voltage level provided for memory access. These static policy settings are typically predetermined by system software or as a result of customer input. However, the voltage regulators of the memory (i.e., DIMM regulators) factor into the efficiency of the memory complex and should be taken into account when balancing power savings and efficiency in a computing device. For at least the aforementioned reasons, there is a need to improve memory usage management systems and techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for allocating memory usage based on voltage regulator efficiency. According to an aspect, a method may be performed at a computing device including memory devices. The method may include receiving a first efficiency value of a first voltage regulator associated with a first memory device of the memory devices. The method may also include receiving a second efficiency value of a second voltage regulator associated with a second memory device of the memory devices. The method may also include receiving a request to write data to one of the first memory devices and the second memory device. The method may also include determining whether to write the data to the first memory device or the second memory device based on the first and second efficiency values. Further, the method may include writing the data to the first memory device or the second memory device based on the determination.

According to another aspect, a method may be performed at a computing device including multiple memory devices that are each associated with a respective voltage regulator among multiple voltage regulators. The method may include determining a peak efficiency value range for each voltage regulator. The method may also include determining whether an efficiency value of one of the voltage regulators is not within the peak efficiency value range of the associated voltage regulator. Further, the method may include reallocating memory usage among the memory devices in response to determining that the efficiency value of one of the voltage regulators is not within the peak efficiency value range.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of computing device, for example, a conventional computer, a server, notebook computer, tablet computer, or the like. A computing device can also include mobile computing device, for example, a smartphone, a mobile telephone, a personal digital assistant, or the like.

The present invention is now described in more detail. For example, FIG. 1 illustrates a system for allocating memory among multiple memory devices based on the efficiency of voltage regulators associated with the memory devices in accordance with embodiments of the present invention.

Figure 1:
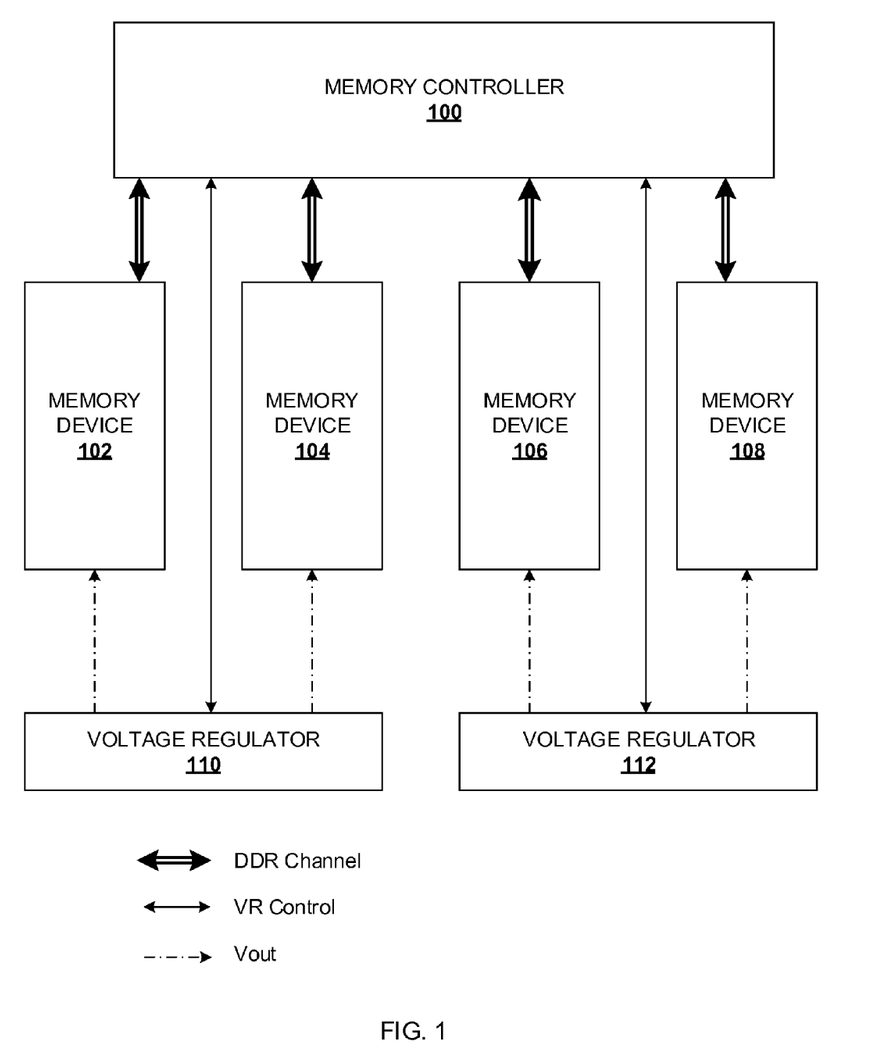
FIG. 1 is a block diagram of an example system for allocating memory amongst multiple memory devices based on the efficiency of multiple voltage regulators associated with the memory devices in accordance with embodiments of the present invention.

Referring to FIG. 1, the computing device may include a memory controller 100 configured to control access to and communicate with memory devices 102-108. For example, the memory controller 100 may be a separate chip on a motherboard of the computing device. In another example, the memory controller 100 may include hardware, software, firmware, or combinations thereof. In another example, the memory controller 100 may be integrated within a processor of the computing device to reduce memory latency issues with in the computing device. In another example, the memory devices 102-108 may each include a DIMM. Another example memory device includes, but is not limited to a non-volatile RAM DIMMS. As shown in FIG. 1, the memory controller 100 may access and communicate with memory devices 102-108 via double data rate (DDR) channels. Even though FIG. 1 only demonstrates a memory controller in communication with four memory devices, it should be understood to those of skill in the art that the memory controller may be in communication with any number of memory devices within a computing device.

As shown in FIG. 1, memory controller 100 may also be configured to control and/or communicate with voltage regulators 110 and 112. Although FIG. 1 shows a memory controller in communication with two voltage regulators, it should be understood to those of skill in the art that the memory controller may control and/or communicate with any number of voltage regulators. In accordance with embodiments of the present invention, each memory device 102-108 may be associated with one of the voltage regulators 110-112 as illustrated in FIG. 1. An example of a voltage regulator may include, but is not limited to, a switching voltage regulator or a linear voltage regulator. FIG. 1 also illustrates that voltage regulators 110-112 are configured to regulate the voltage (Vout) applied to memory devices 102-108.

Typically, voltage regulators operate within an efficiency range depending upon the type of voltage regulator. For example, one of voltage regulators 110 and 112 may be configured to operate within an efficiency range with values of 55%-95%. In this example, the lower part of the range indicates the voltage regulator is operating at low efficiency and the upper part of the range indicates the voltage regulator is operating at a high efficiency. It should be understood to those of skill in the art that the efficiency range of a voltage regulator may comprise a variety of types of value ranges depending upon the type of voltage regulator and should not be limited to the provided example. In another example, the efficiency range of a voltage regulator may be expressed as the power loss. As an example, operating power loss in a single regulator may range between tens of milliwatts (mW) and several watts (W).

Figure 2:
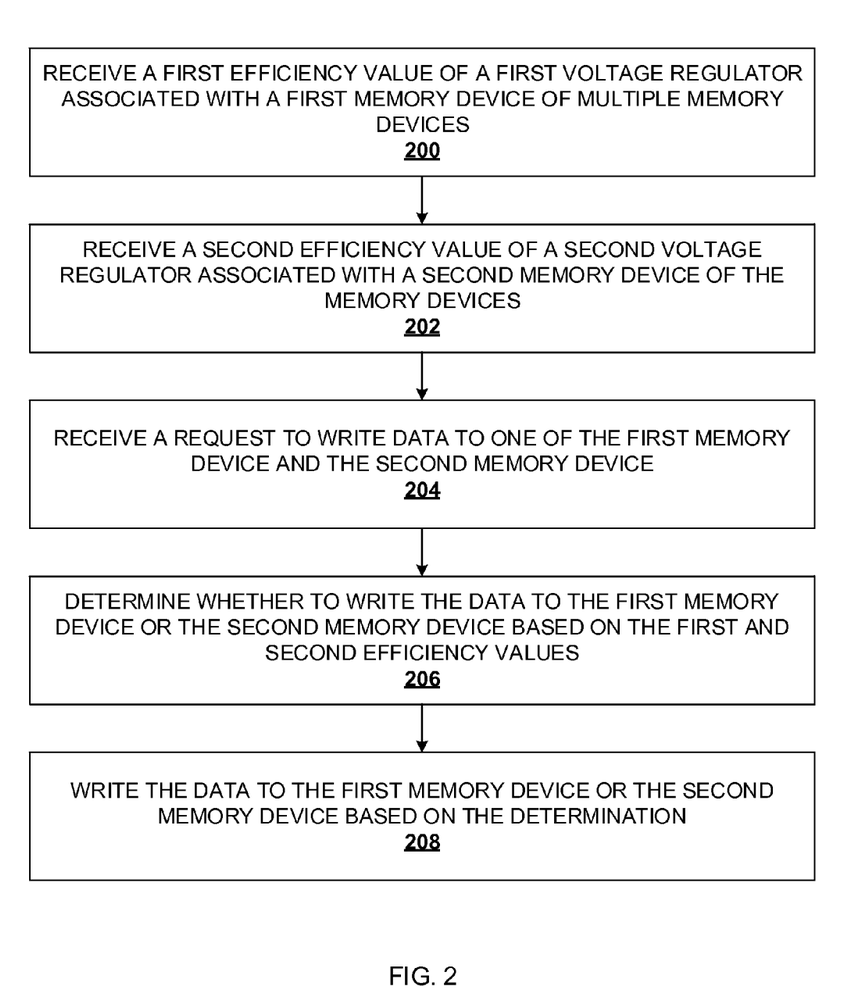
FIG. 2 is a flowchart of an example method for writing data to a first memory device or a second memory device based on a first and second efficiency value associated with the first and second memories in accordance with embodiments of the present invention.

In accordance with embodiments of the present invention, FIG. 2 illustrates a flowchart of an example method for writing data to a first memory device or a second memory device based on a first and second efficiency value associated with the first and second memories. Referring to FIG. 2, the method includes receiving 200, at a computing device one or more processors and memory devices, a first efficiency value of a first voltage regulator associated with a first memory device of the memory devices. For example, memory controller 100 may receive an efficiency value of voltage regulator 110 associated with memory device 102. In embodiments, receiving 200 a first efficiency value may include receiving the first efficiency value from the first voltage regulator. For example, memory controller 100 may receive the efficiency value from voltage regulator 110. In embodiments, receiving 200 a first efficiency value may include receiving the first efficiency value from a third memory device of the memory devices. For example, memory controller 110 may receive the efficiency value associated with voltage regulator 100 from memory device 104.

The method of FIG. 2 includes receiving 202 a second efficiency value of a second voltage regulator associated with a second memory device of the memory devices. For example, memory controller 100 may receive an efficiency value of voltage regulator 112 associated with memory device 106. In embodiments, receiving 200 a second efficiency value may include receiving the second efficiency value from the second voltage regulator. For example, memory controller 100 may receive the efficiency value associated with voltage regulator 112 from voltage regulator 112. In embodiments, receiving 200 a second efficiency value may include receiving the second efficiency value from a third memory device of the memory devices. For example, memory controller 100 may receive the efficiency value associated with voltage regulator 112 from memory device 104. In embodiments, the first and second efficiency values may comprise a percentage value. For example, the efficiency value of voltage regulator 110 may be 85%, and the efficiency value of voltage regulator 112 may be 91%. In another embodiment, the first and second efficiency values may include a power loss value. For example, the efficiency of voltage regulator 110 may be between 50% and 97% with power loss ranging between 10 mW and 10 W.

Figure 3:
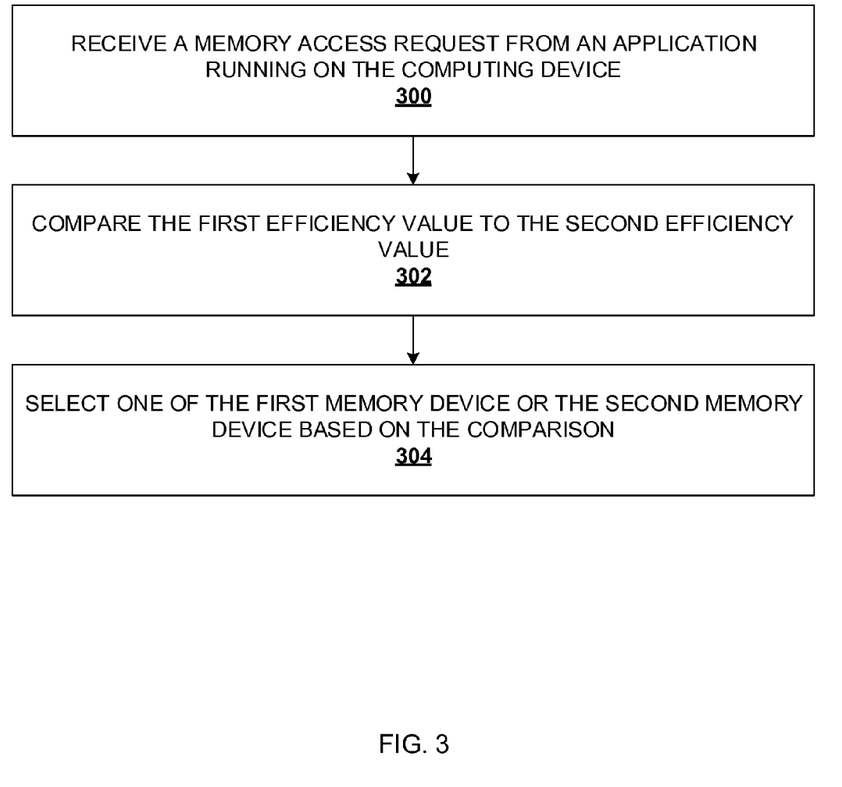
FIG. 3 is a flowchart of an example method of receiving a memory access request from an application running on a computing device in accordance with embodiments of the present invention.

FIG. 2 also illustrates the method comprises receiving 204 a request to write data to one of the first memory device and the second memory device. In embodiments, receiving 204 may include, as illustrated in FIG. 3, receiving 300 a memory access request from an application running on the computing device. For example, memory controller 100 may receive a request from an application running on the computing device to write data to one of memory devices 102-108. Returning back to FIG. 2, the method also comprises determining 206 whether to write the data to the first memory device or the second memory device based on the first and second efficiency values. For example, memory controller 100 determines whether to write data to one of memory device 102 and 106 based on the first efficiency value of voltage regulator 110 and the second efficiency value of voltage regulator 112, respectively.

As illustrated in FIG. 3, determining 206 may include comparing 302 the first efficiency value to the second efficiency value. In accordance with embodiments of the present invention, the comparison 302 may indicate which of the first or second voltage regulators is operating most efficiently. For example, the memory controller 100 may compare the efficiency value of voltage regulator 110 to the efficiency value of voltage regulator 112. In this example, the comparison may indicate that voltage regulator 112 is operating more efficiently, if, for example, voltage regulator 112 is operating at 90% efficiency versus voltage regulator 110 operating at 85% efficiency.

In embodiments, also illustrated in FIG. 3, determining 206 may include selecting 304 the first memory device or the second memory device based on the comparison. In accordance with embodiments of the present invention, selecting 304 includes selecting which of the first voltage regulator and second voltage regulator that is operating more efficiently. Continuing the above example, memory controller 100 may select voltage regulator 112 that is operating more efficiently.

Returning to FIG. 2, the method also comprises writing 208 the data to the first memory device or the second memory device based on the determination. Continuing the above example, memory controller 100 may write data from an application running on the computing device to memory 106 after determining voltage regulator 112 was operating more efficiently than voltage regulator 110. Thus, the computing device comprising memory controller 100 is able to dynamically manage energy resources when balancing power savings and efficiency in the computing device.

Figure 4:
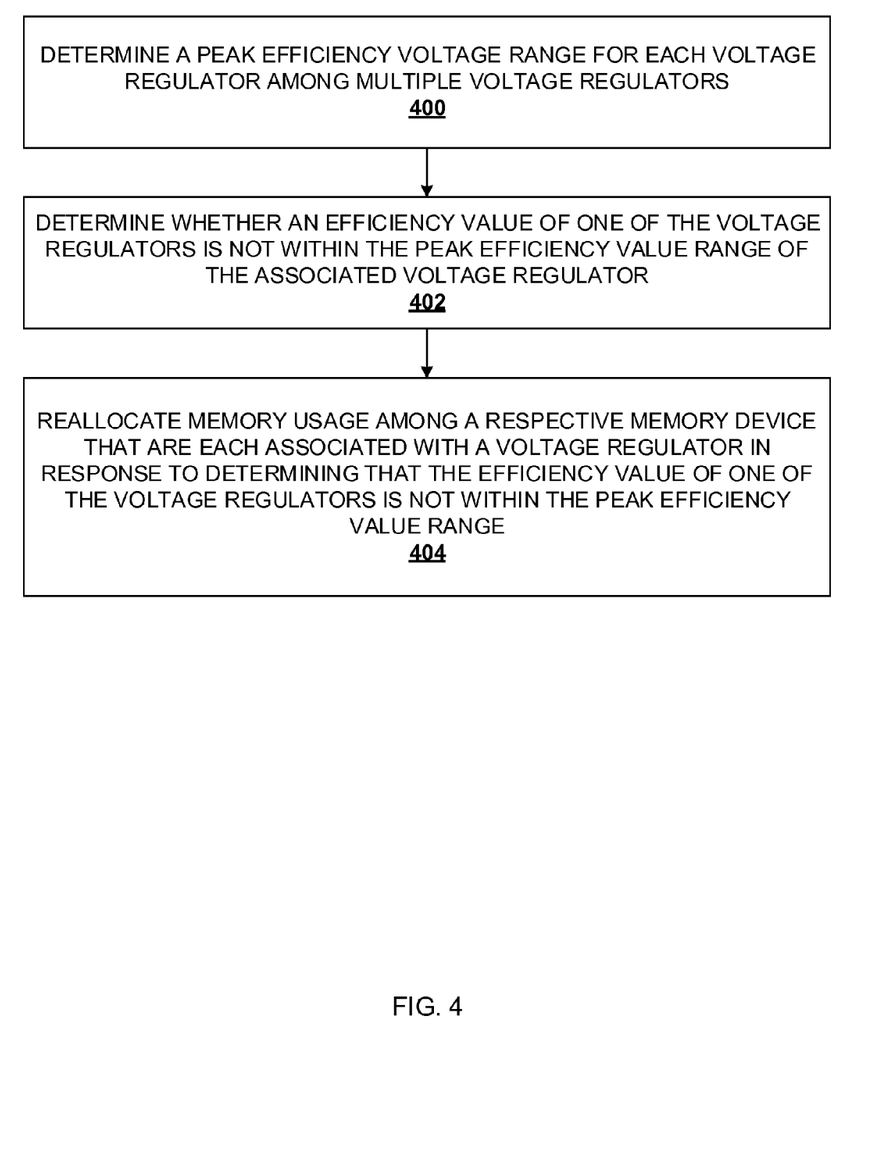
FIG. 4 is a flowchart of an example method reallocating memory usage among the memory devices in response to determining that the efficiency value of one of the voltage regulators is not within the peak efficiency value range in accordance with embodiments of the present invention.

In accordance with embodiments of the present invention, FIG. 4 illustrates a flowchart of an example method reallocating memory usage among memory devices in response to determining that the efficiency value of one of the voltage regulators is not within the peak efficiency value range.

Referring to FIG. 4, the method includes determining 400 a peak efficiency voltage range for each voltage regulator among multiple voltage regulators. In embodiments, the method of FIG. 4 includes receiving an efficiency value from each voltage regulator. For example, memory controller 100 may receive the efficiency values from voltage regulators 110 and 112. In embodiments, the method of FIG. 4 may include retrieving an efficiency value for each of the voltage regulators from one or more of the memory devices. For example, memory controller 100 may retrieve efficiency values for voltage regulators 110 and 112 from memory device 104. In embodiments, the efficiency values may comprise a percentage value. For example, the efficiency value of voltage regulator 110 may be 80%, and the efficiency value of voltage regulator 112 may be 90%. In another embodiment, the efficiency values may include a power loss value.

In embodiments, determining 400 may include retrieving the peak efficiency value range for each voltage regulator from one or more memory devices. Voltage regulators may operate within an efficiency range depending upon the type of voltage regulator. For example, voltage regulators 110 and 112 may be configured to operate within an efficiency range with values of 55%-95%. However, voltage regulators may be associated with a peak efficiency value range that indicates at which efficiency levels the voltage regulator is operating in an optimum state. For example, voltage regulator 110 may be associated with a peak efficiency value range of 90-92%. Otherwise stated, voltage regulator 110 is, in this example, operating at an optimum state when operating at efficiency values of 90-92%. Thus, voltage regulators operating within peak efficiency value ranges may aide in balancing power savings and efficiency in a computing device.

In embodiments, determining 400 may include retrieving the peak efficiency value range for each voltage regulator from at least one of the memory devices. For example, memory controller 100 may retrieve the peak efficiency value for voltage regulators 110 and 112 from memory device 104. In embodiments, determining 400 may include executing a training sequence 500 for each voltage regulator as shown in FIG. 5.

Figure 5:
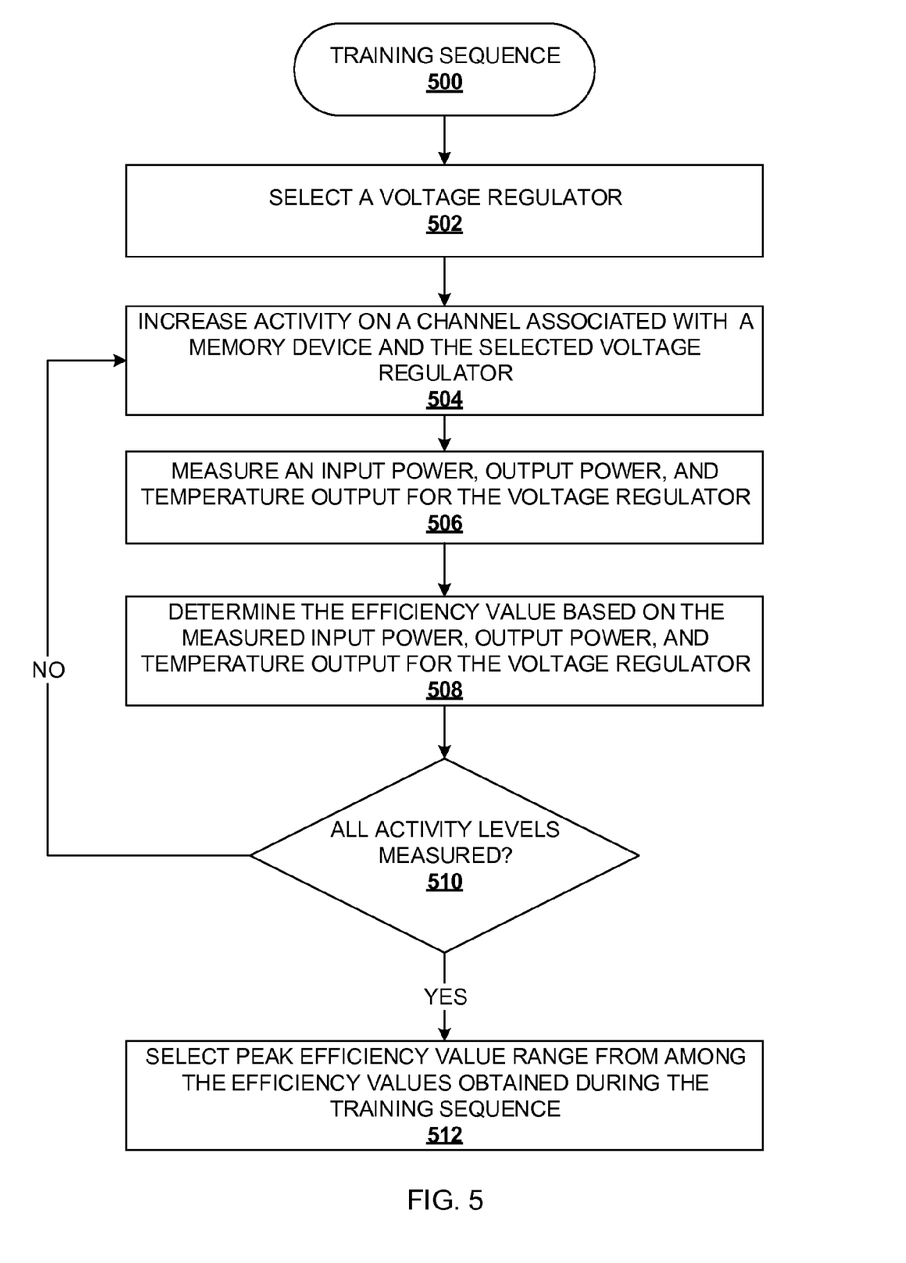
FIG. 5 is a flowchart of an example method of determining a peak efficiency value range by executing a training sequence for each voltage regulator in accordance with embodiments of the present invention.

The training sequence 500 of FIG. 5 begins by selecting 502 a voltage regulator to determine the peak efficiency value range. For example, memory controller may select voltage regulator 112 to execute the training sequence 500 to obtain the peak efficiency value range of voltage regulator 112. The training sequence 500 may include increasing 504 activity on a channel associated with a memory device and the selected voltage regulator. For example, memory controller 100 may increase the activity on the DDR channel between memory controller 100 and memory device 106. Activity, for example, may be the rate at which a CPU DDR controller accesses its local memory. An application requiring more memory may cause more activity on the memory bus.

Once the activity on a channel has been increased, the training sequence 500 may include measuring 506 an input power, output power, and temperature output for the voltage regulator. For example, memory controller 100 may measure the input power, output power, and temperature output for the voltage regulator 112 which is associated with memory device 106.

After measuring, the training sequence 500 may include determining 508 the efficiency value based on the measured input power, output power, and temperature output for the voltage regulator. For example, memory controller 100 may determine the efficiency value based on the measured input power, output power, and temperature output for voltage regulator 112 using voltage regulator efficiency value calculations known in the art. In order to determine the peak efficiency value range of a voltage regulator, the training sequence 500 may iteratively 510 increase activity on a channel by determining if all activity levels of a channel have been measured. If all activity levels have not been measured, the training sequence 500 may be repeated until all activity levels have been measured. For example, memory controller 100 may determine if all activity levels of the DDR channel between memory controller 100 and memory device 106 have been measured. If not, the memory controller 100 may run through the steps 504-510 until all activity levels have been measured.

Once all activity levels have been measured, the training sequence 500 may select 512 the peak efficiency value range from among the efficiency values obtained during the training sequence. For example, memory controller 100 may select a peak efficiency value range of 90-92% for voltage regulator 112 based on the results of the training sequence 500.

Figure 6:
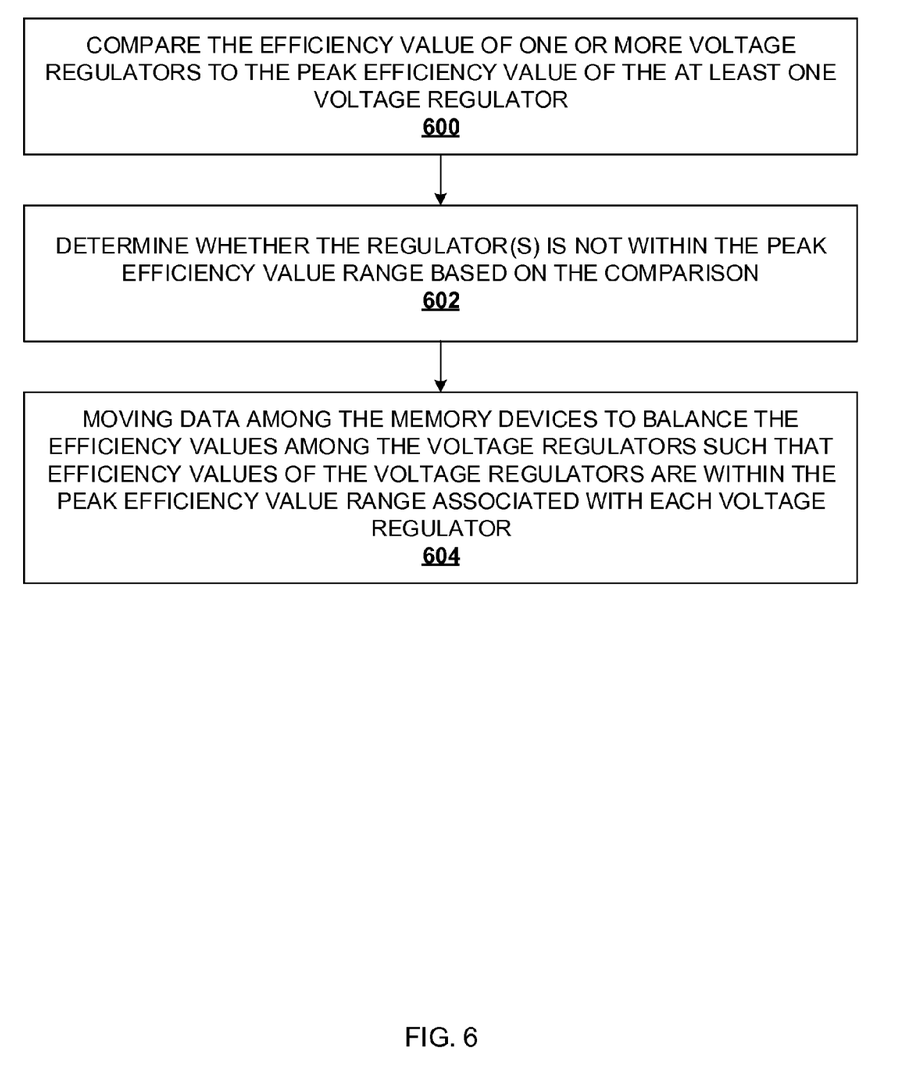
FIG. 6 is a flowchart of an example method for moving data among the memory devices to balance the efficiency values among the voltage regulators such that efficiency values of the voltage regulators are within the peak efficiency value range associated with each voltage regulator.

Returning to FIG. 4, the method also comprises determining 402 whether an efficiency value of one of the voltage regulators is not within the peak efficiency value range of the associated voltage regulator. In accordance with embodiments of the present invention, determining 402 may include comparing 600 the efficiency value of at least one voltage regulator to the peak efficiency value of one or more voltage regulators as shown in FIG. 6. For example, memory controller 100 may compare the efficiency value of voltage regulator 112 to the peak efficiency value associated with voltage regulator 112. In embodiments, the comparison 600 may indicate that the efficiency value is outside of the peak efficiency value range. Continuing the previous example, voltage regulator 112 may be associated with a peak efficiency value range of 90-92% and may be operating at an efficiency value of 75%. In this example, the comparison of efficiency value of voltage regulator 112 to the associated peak efficiency value of voltage regulator 112 may indicate the voltage regulator 112 is operating outside of the peak efficiency value range associated with voltage regulator 112.

FIG. 6 also illustrates that determining 402 may also comprise determining 602 whether the voltage regulator or regulators are not within with the peak efficiency value range based on the comparison. Continuing the above example, memory controller 100 may determine voltage regulator 112 is operating outside its associated peak efficiency value range based on the comparison of is operating efficiency value to its associated peak efficiency value range. Returning to FIG. 4, the method may include reallocating 404 memory usage among the memory devices in response to determining that the efficiency value of one of the voltage regulators is not within the peak efficiency value range. In embodiments, reallocating 404 may include moving 604 data among the memory devices to balance the efficiency values among the voltage regulators such that the efficiency values of the voltage regulators are within the peak efficiency value range associated with each voltage regulator. Continuing the above example, memory controller 100 may move data from memory device 102 associated with voltage regulator 110 to memory device 106 associated with voltage regulator 112 to balance efficiency values of voltage regulators 110 and 112. For example, after the memory controller 100 reallocates memory amongst the memory devices, voltage regulator 112 may operate or possess an efficiency value of 90%, and voltage regulator 110 may operate or possess an efficiency value of 92%.

Figure 7:
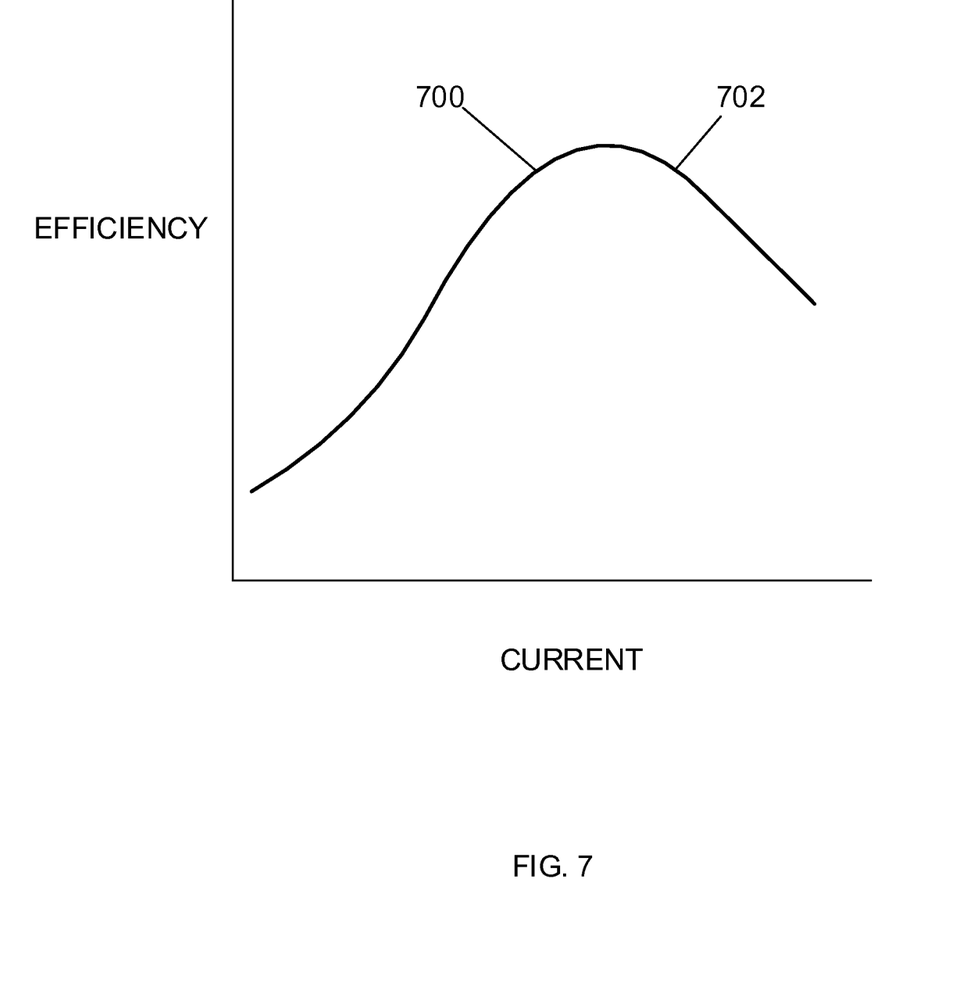
FIG. 7 is a graph depicting an example of voltage regulator efficiency based on current.

FIG. 7 illustrates a graph depicting an example of voltage regulator efficiency based on current. Referring to FIG. 7, the graph shows that the efficiency of the voltage regulator varies depending on current. The peak efficiency at the peak of the curve in this example. In accordance with embodiments, memory usage may be reallocated depending on whether actual current is greater than the peak efficiency current or less than the peak efficiency current. For example, point 700 on the curve indicates an efficiency at one point when the actual current is less than the peak efficiency current, and point 702 on the curve indicates an efficiency at one point when the actual current is greater than the peak efficiency current. In an example of reallocating memory, the load on a memory device may be increased when it is determined that the actual current corresponds to point 700, because more efficiency can be obtained by increased current. Conversely, the load on a memory device may be decreased when it is determined that the actual current corresponds to point 702, because more efficiency can be obtained by decreased current.

Therefore, the present invention balances power savings and efficiency of a computing device by solutions by configuring an operating system of a computing device to be aware and control voltage regulator efficiencies within a memory complex of the computing device.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method, comprising:
at a computing device comprising at least one processor and a plurality of memory devices:
receiving a first efficiency value of a first voltage regulator associated with a first memory device of the plurality of memory devices;
receiving a second efficiency value of a second voltage regulator associated with a second memory device of the plurality of memory devices;
receiving a request to write data to one of the first memory device and the second memory device;
comparing the first efficiency value to the second efficiency value;
selecting one of the first memory device or the second memory device based on the comparison; and
writing the data to the selected one of the first memory device or the second memory device.

2. The method of claim 1, wherein receiving the first efficiency value comprises receiving the first efficiency value from the first voltage regulator, and
wherein receiving the second efficiency value comprises receiving the second efficiency value from the second voltage regulator.

3. The method of claim 1, wherein receiving the first efficiency value and the second efficiency value comprises retrieving the first and second efficiency values from a third memory device of the plurality of memory devices.

4. The method of claim 1, wherein the first and second efficiency values each comprise one of a percentage value and a power loss value.

5. The method of claim 1, wherein receiving a request to write data to one of the first memory device and the second memory device comprises receiving a memory access request from an application running on the computing device.

6. The method of claim 1, wherein the comparison indicates which of the first or second voltage regulators is operating most efficiently.

7. The method of claim 6, wherein selecting comprises selecting which of the first voltage regulator and second voltage regulator that is operating most efficiently.

8. The method of claim 1, wherein each of the first memory device and the second memory device comprises a dual inline memory module (DIMM).

9. A system, comprising:
a computing device comprising at least one processor and a plurality of memory devices, the computing device configured to:
receive a first efficiency value of a first voltage regulator associated with a first memory device of the plurality of memory devices;

receive a second efficiency value of a second voltage regulator associated with a second memory device of the plurality of memory devices;
receive a request to write data to one of the first memory device and the second memory device;
compare the first efficiency value to the second efficiency value;
select one of the first memory device or the second memory device based on the comparison; and
write the data to the selected one of the first memory device or the second memory device.

\* \* \* \* \*